(12) United States Patent
Wise et al.

(10) Patent No.: US 10,363,659 B2
(45) Date of Patent: Jul. 30, 2019

(54) SYSTEM AND METHOD FOR LOAD BALANCING OF ROBOTS TO CREATE MORE EQUIVALENT TASK LOADS ACROSS TASK SERVERS

(71) Applicant: Fetch Robotics, Inc., San Jose, CA (US)

(72) Inventors: Melonee Wise, San Jose, CA (US); Michael Ferguson, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 337 days.

(21) Appl. No.: 15/060,528

(22) Filed: Mar. 3, 2016

(65) Prior Publication Data

US 2017/0252926 A1   Sep. 7, 2017

(51) Int. Cl.
*G06F 13/00* (2006.01)
*B25J 9/16* (2006.01)
*H04L 29/08* (2006.01)

(52) U.S. Cl.
CPC ........ B25J 9/1669 (2013.01); H04L 67/1021 (2013.01); *Y10S 901/50* (2013.01)

(58) Field of Classification Search
CPC ... H04L 29/06115; H04L 47/30; H04L 29/06; H04L 29/06095; H04L 47/10; B25J 9/1671; B25J 9/1679; G01N 1/312; G01N 35/0099; G05B 2219/45092; G06F 13/00
USPC ......................................... 700/247; 709/235
See application file for complete search history.

(56) References Cited

U.S. PATENT DOCUMENTS 8,428,777 B1 * 4/2013 Poursohi .......... G05B 19/41865
700/247

* cited by examiner

*Primary Examiner* — Robert B Harrell
(74) *Attorney, Agent, or Firm* — J. Steven Svoboda (57) ABSTRACT

A method for load balancing of robots includes: receiving, by a first task server configured to manage a first spatial region, a task to be performed by a robot; determining, by the first task server, that the task cannot efficiently be performed within the first spatial region; finding, by the first task server, a second task server configured to manage a second spatial region to which the task can be assigned; and sending, by the first task server, the task to the second task server.

37 Claims, 8 Drawing Sheets

SYSTEM AND METHOD FOR LOAD BALANCING OF ROBOTS TO CREATE MORE EQUIVALENT TASK LOADS ACROSS TASK SERVERS

PRIORITY CLAIM

The present application claims the priority benefit of U.S. provisional patent application No. 62/127,408 filed Mar. 3, 2015 and entitled "System and Method for Load Balancing of Robots," the disclosure of which is incorporated herein by reference.

SUMMARY

Embodiments of this invention relate in general to a system and method for load balancing of robots using one or more task servers configured to control the robots.

A method for load balancing of robots includes: receiving, by a first task server configured to manage a first spatial region, a task to be performed by a robot; determining, by the first task server, that the task cannot efficiently be performed within the first spatial region; finding, by the first task server, a second task server configured to manage a second spatial region to which the task can be assigned; and sending, by the first task server, the task to the second task server.

A system for load balancing of robots includes: at least two robots; a first computer comprising a first task server; and a second computer comprising a second task server, the first task server configured to manage a first spatial region, the first task server operably connected to the at least two robots, the first task server configured to receive a task to be performed by a robot at a site comprising the first spatial region, the first task server further configured to assign the task to one of the two or more robots if the task can efficiently be performed within the first spatial region.

A method for load balancing of robots includes: representing a task to be performed by a robot, by a first task server configured to manage a first spatial region, using a spatial data structure, as a minimum bounding box that encompasses spatial information relating to the task; querying against the spatial data structure, by the first task server; finding, by the first task server, using the minimum bounding box, a second task server that can perform the task, the second task server configured to manage a second spatial region; and sending the task, by the first task server, to the second task server.

A method for load balancing of robots includes: receiving, by a task server comprising a task queue, a task to be performed by a robot; determining, by the task server, that the task can be performed by the robots that the task server manages; and adding the task to the task queue.

A method for load balancing of robots includes: receiving, by a first task server comprising a first task queue, a task to be performed by a robot; determining, by the first task server, that the task cannot be performed by the robots that the first task server manages; finding, by the first task server, a second task server that can perform the task; and sending the task, by the first task server, to the second task server.

A method for load balancing of robots includes: checking, by a task server, that there are tasks remaining in the task server's task queue; checking, by the task server, that there is a robot available to perform the task; and assigning, by the task server, a best robot that is available.

A method for load balancing of robots includes: checking, by a first task server comprising a first task queue, that there are tasks remaining in the first task server's task queue; checking, by the first task server, that there is not a robot available to perform the task; determining, by the first task server, that a task queue time for which the task has been queued exceeds a trigger time; finding, by the first task server, a second task server that can fulfill the task; sending, by the first task server, the queued task to the second task server; and removing, by the first task server, the task from the first task server's task queue.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and the details of certain components can be altered without substantially impairing the functioning of the invention. It is intended, therefore, that the subject matter in the above description shall be interpreted as illustrative and shall not be interpreted in a limiting sense.

According to embodiments of the invention, a system for load balancing of robots comprises one or more robots and one or more task servers operably connected to the one or more robots. For example, the one or more task servers may be wirelessly connected to the one or more robots. For example, the one or more task servers may be connected through a wired connection to the one or more robots. According to other embodiments of the invention, at least one of the one or more task servers is configured to receive a task. According to further embodiments of the invention, at least one of the one or more task servers is configured to assign a received task to one of the one or more robots. According to further embodiments of the invention, at least one of the one or more task servers is configured to manage one or more of the one or more robots.

For example, the task comprises one or more actions. For example, the task comprises fulfilling an order. For example, the task comprises a pick list of items to collect. For example, the task comprises generating a task status indicator. For example, the task status indicator comprises a task completion indicator indicating completion of the task. For example, the task status indicator comprises a task status indicator sound. For example, the task comprises transporting an item to a destination. For example, the item comprises an inventory item. For example, the item comprises an order item. For example, the destination comprises a packing station. For example, the task comprises surveying a site. For example, the site comprises a portion of a building. For example, the site comprises a warehouse.

For example, the task comprises tending a machine. For example, the task comprises removing one or more finished parts from a machine on a floor of a workcell. For example, the task comprises navigating to a particular destination. For example, the task comprises navigating down an aisle in the site. For example, the task comprises recording a location of an item. For example, recording may be performed using an antenna. For example, the robot comprises an antenna configured to record the location of the item. For example, the antenna comprises a radio frequency identification (RFID) antenna. For example, the recording is performed using the RFID antenna to read an RFID tag comprised in the item.

For example, the task server receives the task from a site management system. For example, the task server receives the task through a web interface. For example, the task server receives the task from a mobile phone. Two or more of the task servers may be operably connected to each other. For example, a first task server receives the task from a second task server. For example, the task server receives the task from a load balancer that forwards tasks from a web client to the task server.

According to embodiments of the invention, the system manages tasks performed at a site comprising one or more spatial regions. According to further embodiments of the invention, at least one task server may manage a specific spatial region. For example, the task server manages one or more robots that are located within its spatial region. For example, the task server manages all robots that are located within its spatial region. For example, the task server manages one or more robots that are assigned tasks that are to be performed within its spatial region. For example, the task server manages all robots that are assigned tasks that are to be performed within its spatial region. For example, the task server assigns to a robot a task that is to be performed within its spatial region. For example, the task server assigns to a robot all tasks that are to be performed within its spatial region.

The definitions of the spatial regions may be stored in a database. For example, a spatial region database is configured to map task servers to spatial regions that the task servers manage. For example, the spatial region database may be stored on a task server. For example, the spatial region database may be stored on a server other than a task server. For example, the spatial region database may be distributed across one or more servers, some of which may be task servers.

The spatial region database comprises data regarding one or more spatial regions including one or more of a spatial region managed by a task server, a current location of a robot, a status of a task being performed in the spatial region, and a load on a task server managing the spatial region. The status of a task comprises one or more of an estimated completion percentage of the task that has been currently completed and a task queue at which the task is queued. For example, a completed task has an estimated completion percentage of 100%. A task that has not yet been started has an estimated completion percentage of 0%.

For example, the task server assigns the task to an idle robot, which may be defined as a robot with no pending tasks. For example, an idle robot may be defined as having only pending tasks that are preemptable by the task server. For example, a task server may advertise an idle robot's availability to one or more other task servers. For example, when a task server has pending tasks and no available robots, the task server may ask other task servers if they have any available robots. For example, the task server may ask other task servers if they have any idle robots.

According to still other embodiments of the invention, after a task is received, the task server may directly send it to a robot in the task server's spatial region. According to further embodiments of the invention, the task server may place the task in a task queue. For example, the task queue comprises one or more uncompleted tasks. For example, the task server may place the task in an internal task queue. For example, if a task server is currently occupied with a first task, and the task server receives a second task, the task server task queues the second task.

According to still other embodiments of the invention, the task server determines if it can complete a portion of the task using the robots within its own spatial region. For example, the task server determines if it can complete the portion of the task using the robots within its own spatial region. For example, the task server determines if it can efficiently complete the task using the robots within its own spatial region. For example, the task server determines if the task requires travel outside of its own spatial region.

For example, if the task server cannot efficiently complete the task, the task server forwards the task to a second task server that can complete the task using the robots within its second spatial region. Criteria for determining efficiency can be predetermined by a user.

For example, the first task server determines the second task server associated with the second spatial region in which the task is to be performed. For example, the first task server may query the spatial region database to find a second task server that manages an optimum spatial region in which to perform the task. For example, the first task server may consult a set of other task servers to find a second task server that has a lower load.

For example, one or more robots may be shared between task servers. For example, one or more robots are shared between a task server that cannot efficiently complete a task and a task server that can efficiently complete the task. For example, if a shared robot completes the task, the shared robot moves into the spatial region controlled by the task server that can efficiently complete the task.

Alternatively, or additionally, two or more task servers may manage an overlap region, defined as a spatial region managed by two or more task servers. For example, a first spatial region that a first task server manages may overlap in the overlap region with a second spatial region that a second task server manages. For example, two (or more) servers may manage the same spatial region, in which case the overlap region can be identified with the spatial region managed by the two servers.

Alternatively, or additionally, no overlap region exists. In this case, at most one task server manages a given spatial region.

According to further embodiments of the invention, the spatial region covered by a task server may dynamically change. For example, the task server changes the spatial region covered by the task server based on one or more of a dynamic condition and a task server criterion. For example, the task server criterion is predetermined by a user. For example, the task server criterion comprises a load on the task server.

Load balancing of a robotic system across task servers can enhance one or more of system efficiency and system functionality. A load on a task server can be defined as one or more of a number of active robots, a number of active tasks, a length of a server's task queue, a central processing unit (CPU) load by the task server, memory load on the task server, and a percentage of robots in a task server's spatial region that are active.

Load balancing can be a heuristic endeavor. For example, on a slow day in a site comprising a warehouse, 30% of all robots may be needed for a current task load. If a spatial region managed by a server has, for example, a 200% task level, embodiments of the invention would redefine spatial regions so as to make task loads of the different task servers less unequal. For example, the system for load balancing may redefine the spatial regions so as to reduce a task load of the busy server to well below 100%, for example, to approximately 80%, while increasing the respective task loads of the other task servers to between approximately 25% and approximately 35%. As another example, the system for load balancing may redefine the spatial regions so as to adjust the respective task loads of the task servers, including the busy server, to between approximately 35% to approximately 50%. The more equitable the distribution of task loads following load balancing by the system, the greater the potential for one or more of higher system efficiency and higher system functionality.

For example, the system comprises a master server. For example, the system comprises exactly one master server. The master server assigns spatial regions to the task servers so as to approximately balance loads on two or more of the task servers. For example, the master server updates the spatial region database with one or more of a spatial region and an assignment of a task server to a spatial region.

For example, the master server comprises the spatial region database. For example, the master server does not comprise the spatial region database. For example, a task server can send a spatial region coverage request to the master server. For example, the master server divides the site into spatial regions. For example, the master server assigns one or more spatial regions to a task server. For example, the master server assigns spatial regions to task servers so that the site is divided up among task servers with substantially no spatial region in the site unassigned to a task server. The master server receives the spatial region coverage request. For example, the master server reviews current spatial region assignments and then answers the spatial region coverage request by sending a spatial region coverage answer to the task server.

According to embodiments of the invention, two or more task servers perform load balancing in a distributed fashion.

The task servers communicate with each other and interactively assign spatial regions to the task servers so as to approximately balance loads on two or more of the task servers. For example, the updated spatial regions are written to the spatial region database.

For example, a task server changes the spatial region covered by a task server. For example, the task server changes the spatial region covered by a task server based on one or more of types of tasks being assigned to the system, a quantity of tasks being assigned to the system, and a goal to more appropriately apportion tasks between task servers. For example, the goal comprises creating one or more of more equivalent task loads, more equivalent number of tasks, and more similar task queue lengths. For example, the task server changes the spatial region covered by a task server so that at least two task servers have more equivalent task loads. For example, the task server changes the spatial region covered by a task server so that at least two task servers have more equivalent numbers of tasks. For example, a task server changes the spatial region covered by a task server so that at least two task servers have task queues of more similar lengths.

For example, finding a second task server to which a task can be assigned comprises finding a second task server that has an available robot to perform the task. For example, finding a second task server comprises querying a spatial region database. For example, finding a second task server comprises analyzing a load on one or more of the first task server and the second task server.

For example, a task server transfers a portion of a first spatial region from a first task server to a second task server, at which point the transferred portion becomes part of the second spatial region. For example, the task server performs the transfer in response to a transfer trigger. For example, the transfer trigger comprises a task load indicator. For example, the transfer trigger comprises a task load indicator showing that the second task server has a lower task load than the first task server. For example, the transfer trigger comprises a task load indicator showing that the second task server has a below average task load.

For example, a task server monitors one or more of its own load and its own task queue. For example, the task server determines that for maximum efficiency, it needs to offload portions of its spatial region to another task server. For example, a first task server may put a portion of its spatial region up for auction to other task servers that respond to the auction. For example, the auctioning task server is currently unable to handle its pending tasks. For example, the load on the auctioning task server is high. For example, the auctioning task server decides to which responding task servers to send portions of its spatial region. For example, the updated spatial regions are written to the spatial region database.

The system for load balancing of robots further comprises an optional load balancer. The load balancer is configured to receive an incoming task. The load balancer is further configured to select a task server that can handle the task. The load balancer is further configured to forward the task to the task server. In embodiments in which the load balancer is not present, a requester or other entity sending the task can send to a specific task server.

The load balancer typically, although not necessarily, employs simple methods for selecting the particular task server to which it forwards the incoming tasks. For example, the load balancer performs a round-robin scheduling in which each incoming task is sent to a next task server in a fixed ordering of task servers. For example, the load balancer sends task requests to the task servers so as to minimize differences between estimated loads of the task servers. Alternatively, the load balancer finds an optimum task server to receive an incoming task based on a review by the load balancer of the spatial region database so as to assess a current state of spatial regions.

A spatial region may further comprise a robot storage configured to store robots that are not currently engaged in a task. The robot storage may comprise one or more robot charging stations configured to charge robots not currently engaged in a task.

According to further embodiments of the invention, the task server represents a task by a minimum bounding box that encompasses spatial information relating to the task. For example, the minimum bounding box comprises a spatial cue relating to the task. For example, the minimum bounding box comprises a spatial cue relating to an action comprised in the task. For example, the minimum bounding box comprises a spatial cue relating to each of the actions comprised in the task. For example, the task server may use the minimum bounding box when deciding if a task can be performed within the spatial region of the task server.

According to further embodiments of the invention, the task server performs an optimization step in which it attempts to change a size of the minimum bounding box by adjusting some or all of the actions of the task. For example, the task server may try to reduce the size of the minimum bounding box so that the area of the bounding box is minimal. For example, the task server may try to change the size of the minimum bounding box so that the bounding box lies entirely within the spatial region of the task server. For example, if the task comprises a pick list, the task server may adjust the bins selected from which the items are to be picked in order to reduce the minimum bounding box size. For example, the task may divide the task into at least two sub-tasks. For example, if the task is a survey task that covers a large spatial region, the task server may divide the task into at least two sub-tasks to reduce the minimum bounding box of at least one of the new tasks.

According to further embodiments of the invention, the changing of spatial region coverage may be centrally controlled. For example, one master server may centrally control the dynamic behavior. For example, the master server may monitor the loads of one or more of the other task servers. For example, the master server may monitor the loads of each of the other task servers. For example, the master server may reallocate the spatial regions respectively allocated to at least one of the task servers. For example, the master server may reallocate the spatial regions respectively allocated to each of the task servers. For example, one entity may centrally control the dynamic behavior. For example, control of the dynamic behavior may be distributed across two or more entities. For example, there may be multiple master servers, each managing the spatial region coverage of a portion of the task server cluster.

In another embodiment of the system, the reallocation of the spatial regions may comprise transferring one or more robots from one task server to another. Such robot transfers may help maintain a more equal distribution of work across the task servers.

Figure 1:
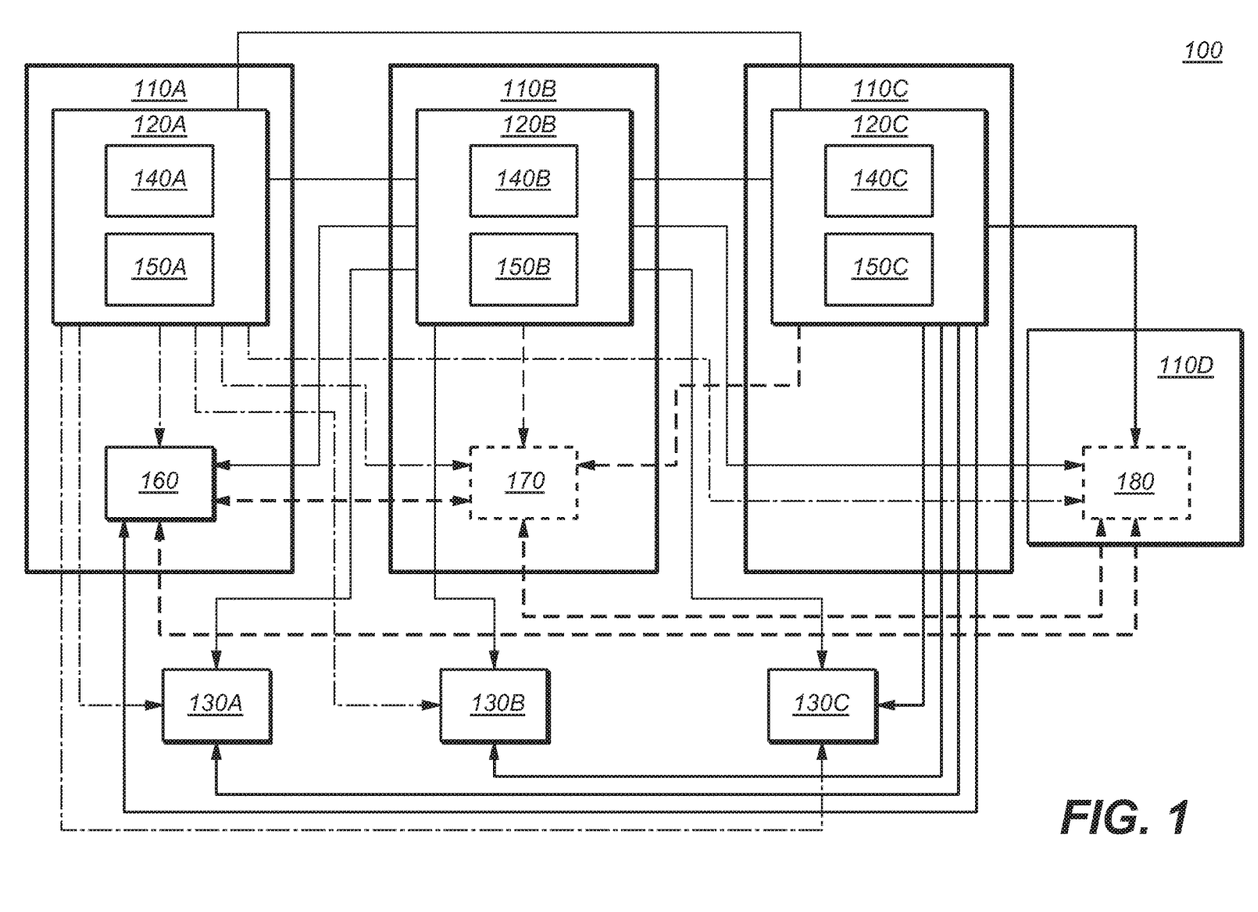
FIG. 1 is a block diagram of a system for load balancing of robots.

FIG. 1 is a block diagram of a system 100 for load balancing of robots. The system 100 comprises a first computer 110A, a second computer 110B, and a third computer 110C. Optionally, and as depicted, the system 100 further comprises a fourth computer 110D. The first computer 110A comprises a first task server 120A. The second computer 110B comprises a second task server 120B. The third computer 110C comprises a third task server 120C. The task servers 120A-120C are interconnected to one another.

The system 100 further comprises robots 130A-130C operably connected to one or more of the task servers 120A-120C. As depicted, each of the robots 130A-130C is operably connected to each of the task servers 120A-120C. Alternatively, or additionally, a robot 130A-130C can be operably connected to one or more of the task servers 120A-120C without necessarily being operably connected to each of the task servers 120A-120C.

The task servers 120A-120C comprise respective task routers 140A-140C and respective task queues 150A-150C. The task routers 140A-140C are configured to route a task to one or more of a task server 120A-120C, a robot 130A-130C able to perform the task and a task queue 150A-150C. One or more of the computers 110A-110D further comprises a spatial region database 160 operably connected to the task servers 120A-120C. As depicted, the first computer 110A further comprises the spatial region database 160. Optionally, one or more of the computers 110A-110D further comprises a master server 170 operably connected to the task servers 120A-120C, the master server 170 configured to manage allocation of spatial regions to the task servers 120A-120C. Optionally, the master server 170 may be configured to manage assignment of robots 130A-130C to the task servers 120A-120C. As depicted, the second computer 110B further comprises the master server 170. Optionally, the master server 170 is operably connected to the spatial region database 160.

Optionally, one or more of the computers 110A-110D further comprises a load balancer 180 operably connected to the task servers 120A-120C, the load balancer 180 configured to distribute incoming tasks to the task servers 120A-120C. As depicted, the fourth computer 110D comprises the load balancer 180. Locating the load balancer 180 on the fourth computer 110D may be desirable for certain applications because the load balancer 180 may have a heavy workload. Accordingly, it may be desirable, as depicted, to locate the load balance 180 on the fourth computer 110D, as the fourth computer 110D is a computer 110A-110D that does not comprise a task server 120A-120C.

Optionally, the load balancer 180 is operably connected to the spatial region database 160. Optionally, the load balancer 180 is operably connected to the master server 170.

Figure 2A:
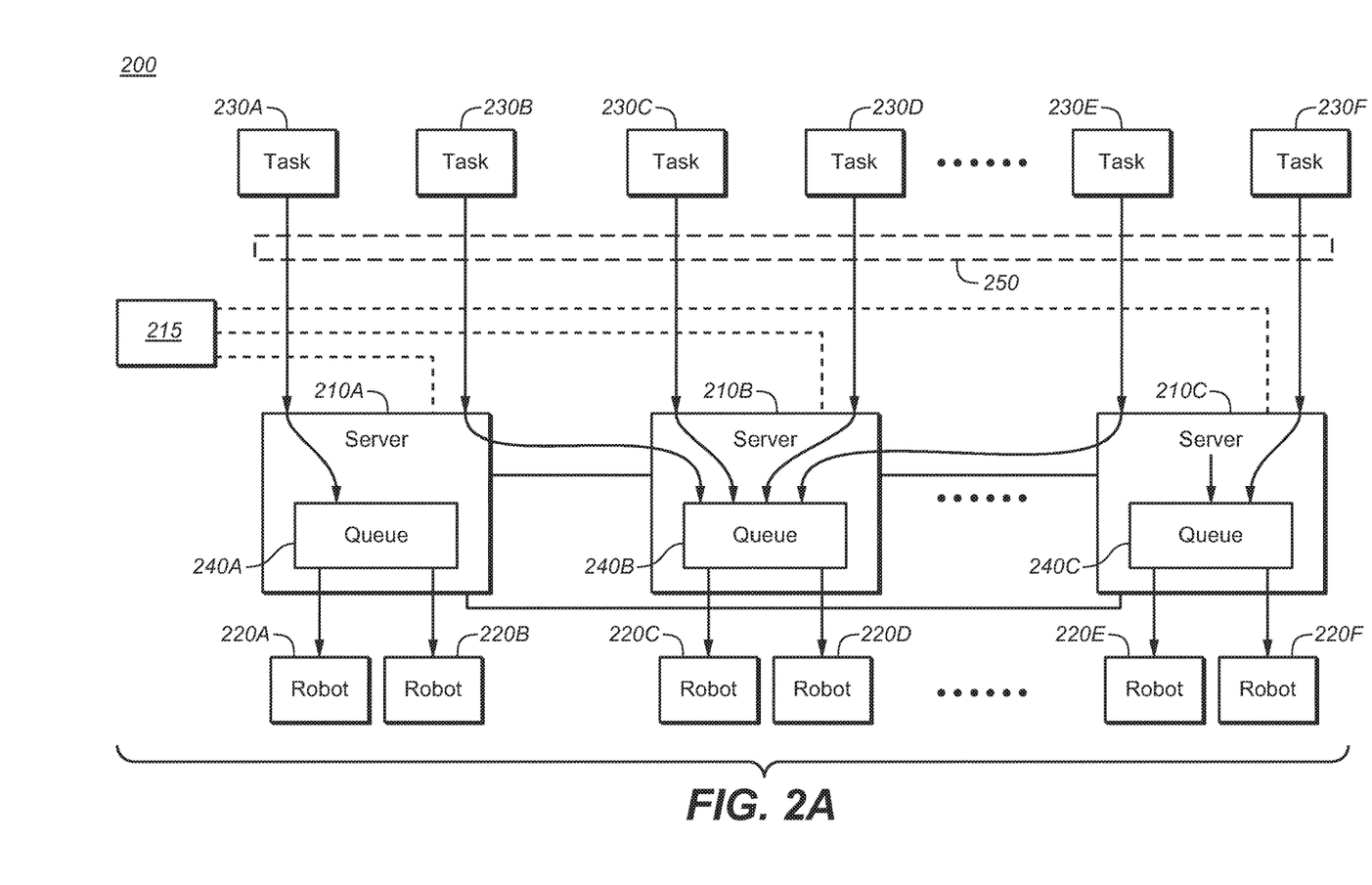
FIGS. 2A-2B are block diagrams of systems for load balancing of robots.
Figure 2B:
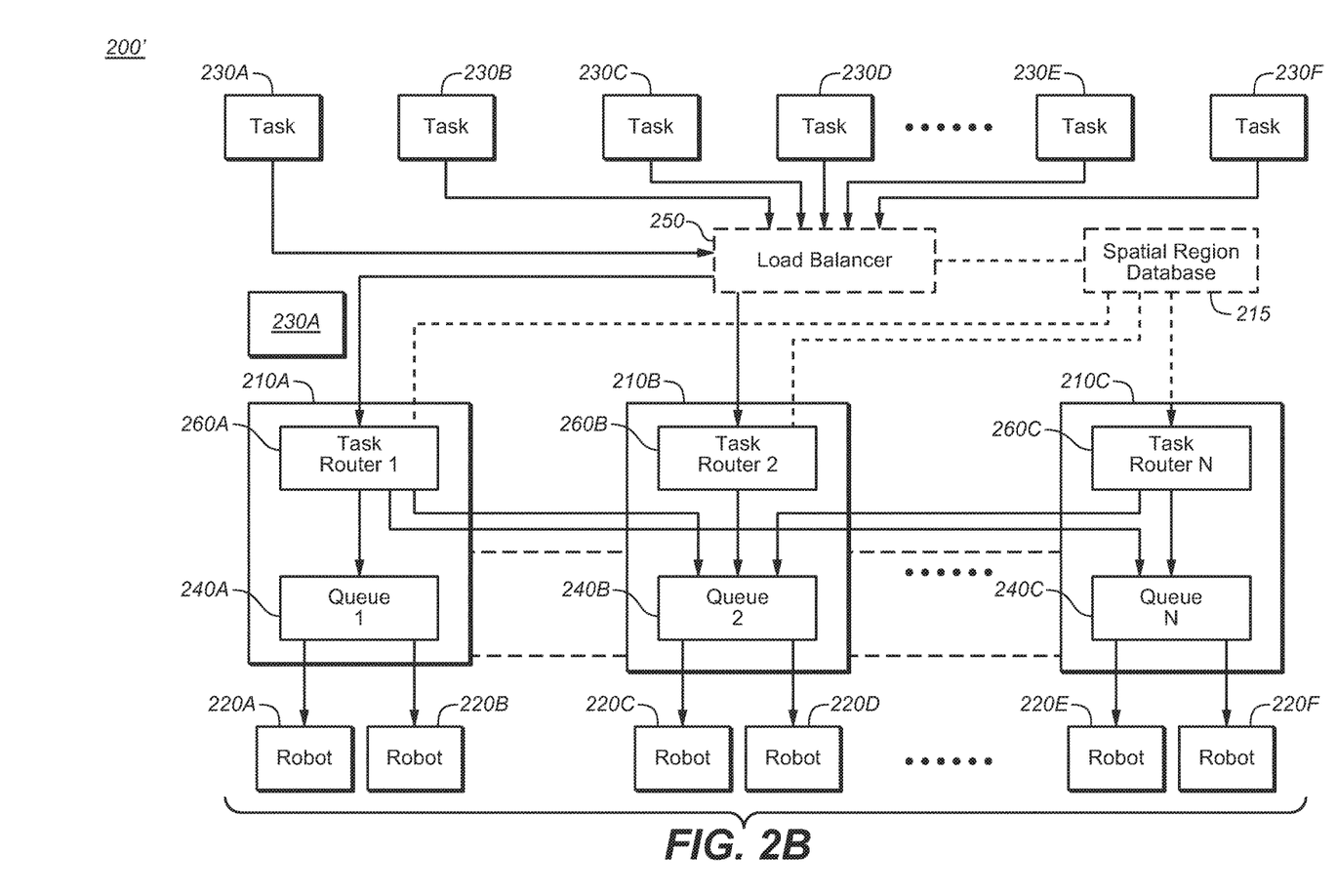

FIGS. 2A-2B are block diagrams of systems 200 and 200' for load balancing of robots.

FIG. 2A is a block diagram of the flow of tasks through a system 200 comprising several task servers 210A-210C. The task servers 210A-210C are interconnected to one another. The task servers 210A-210C manage corresponding spatial regions (not shown) via a consultation of a spatial region database 215.

Moreover, the first task server 210A manages robots 220A-220F that are currently located within the spatial region (not shown) corresponding to the first task server 210A. Similarly, the second task server 210B manages robots 220A-220F that are currently located within the spatial region (not shown) corresponding to the second task server 210B. Moreover, the third task server 210C manages robots 220A-220F that are currently located within the spatial region (not shown) corresponding to the third task server 210C. As depicted, the first task server 210A currently manages a first robot 220A and a second robot 220B. As depicted, the second task server 210B currently manages a third robot 220C and a fourth robot 220D. As depicted, the third task server 210C currently manages a fifth robot 220E and a sixth robot 220F.

Tasks 230A-230F flow into the system. Tasks 230A-230B are directed to the first task server 210A. Tasks 230C-230D are directed to the second task server 210B. Tasks 230E-230F are directed to the third task server 210C.

The first task server 210A comprises a first task queue 240A. The second task server 210B comprises a second task queue 240B. The third task server 210C comprises a third task queue 240C.

The spatial region database 215 comprises data regarding one or more spatial regions (not shown) including one or more of a spatial region (not shown) managed by a task server 210A-210C, a current location of a robot 220A-220F, status of a task 230A-230F being performed in the spatial region (not shown), and the load on a task server 210A-210C managing the spatial region (not shown). The status of a task 230A-230F comprises one or more of an estimated completion percentage of the task 230A-230F that has been currently completed and the task queue 240A-240C at which the task 230A-230F is queued. For example, a completed task has an estimated completion percentage of 100%. A task that has not yet been started has an estimated completion percentage of 0%.

A load on a task server 210A-210C can be defined as one or more of a number of active robots 220A-220F, a number of active tasks 230A-230F, a length of a task queue 240A-240C, a central processing unit (CPU) load by the task server 210A-210C managing the spatial region (not shown), a memory load on the task server 210A-210C, and a percentage of robots 220A-220F in a spatial region (not shown) of a task server 210A-210C that are active.

To determine spatial region requirements of the task 230A, the first task server 210A checks one or more of the first task 230A and the spatial region database 215. If the spatial region requirements of the task 230A lie within the spatial region corresponding to the first task server 210A, it is likely that the first task server 210A can handle the task 230A. If the spatial region requirements of the task 230A do not lie within the spatial region corresponding to the first task server 210A, it is likely that the first task server 210A cannot handle the task 230A.

If the first task server 210A determines that the task 230A can be carried out within the spatial region managed by task server 210A, the first task server 210A places the task 230A in its task queue 240A. Upon receiving a robot availability notification, the first task server 210A forwards the task 230A to one or more of the first robot 220A and the second robot 220B.

If the first task server 210A determines that the task 230B cannot be carried out within the spatial region managed by the first task server 210A, the first task server 210A finds another task server 210B to which the task 230B can be forwarded. Optionally, the first task server 210A queries the spatial region database 215 to find the task server 210B to which to forward the task 230B. As depicted, the first task server 210A finds that the second task server 210B manages the spatial region in which the task 230B is to be performed. As depicted, the first task server 210A forwards the task 230B to the second task server 210B. As depicted, the first task server 210A places the task 230B in the second task queue 240B of the second task server 2106. The second task server 2106 then takes over managing the task 230B.

Similarly, if the third task server 210C determines that the task 230E cannot be carried out within the spatial region managed by the first task server 210A, the third task server 210C finds another task server 210B to which the task 230E can be forwarded. Optionally, the third task server 210C queries the spatial region database 215 to find the task server 210B to which to forward the task 230E. As depicted, the third task server 210C finds that the second task server 210B manages the spatial region in which the task 230E is to be performed. As depicted, the third task server 210C forwards the task 230E to the second task server 210B. As depicted, the third task server 210C places the task 230E in the second task queue 240B of the second task server 210B. The second task server 210B then takes over managing the task 230E.

At such time that a robot 220A-220B is available, the first task server 210A assigns the task 230A from the first task queue 240A to the available robot 220A-220B. Similarly, at such a time that a robot 220C-220D is available, the task server 210B assigns the tasks 230B, 230C, 230D, and 230E from the second task queue 240B to the available robot 220C-220D. Similarly, at such time that a robot 220E-220F is available, the third task server 210C assigns the task 230F from the third task queue 240C to the available robot 220E-220F.

The system 200 further comprises an optional load balancer 250. The load balancer is configured to receive the incoming tasks 230A-230F and to forward the incoming tasks on to a task server 210A-210C. In embodiments in which the load balancer 250 is not present, a requester or other entity sending the task can send to a specific task server 210A-210C.

The load balancer 250 typically employs simple methods for selecting the particular task server 210A-210C to which it forwards the incoming tasks 230A-230F. For example, the load balancer 250 performs a round-robin scheduling in which an incoming task 230A-230F is sent to a next task server 210A-210C in a fixed ordering of task servers 210A-210C. For example, the load balancer 250 sends tasks 230A-230F to the task servers 210A-210C so as to minimize differences between estimated loads of the task servers 210A-210C. Alternatively, the load balancer 250 consults the spatial region database 215 to determine an optimum task server 210A-210C to receive an incoming task 230A-230C.

FIG. 2B is a block diagram of the flow of tasks through an alternative system 200'. Tasks 230A-230F flow into the system 200'. The task servers 210A-210C are interconnected to one another. The task servers 210A-210C present in the system 200 in FIG. 2A are broken down in the system 200' into two components, the task queues 240A-240C, and task routers 260A-260C to which the tasks 230A-230F are forwarded. The task routers 260A-260C are configured to route the tasks 230A-230F to one or more of a task server 210A-210C, a robot 220A-220F able to perform the task, the first task queue, and the second task queue the task queues 240A-240C. The first task server 210A comprises a first task queue 240A and a first task router 260A. The second task server 210B comprises a second task queue 240B and a second task router 260B. The third task server 210C comprises a third task queue 240C and a third task router 260C.

The spatial region database 215 again comprises data regarding one or more spatial regions (not shown) including one or more of a spatial region (not shown) managed by a task server 210A-210C, a current location of a robot 220A-220F, status of a task 230A-230F being performed in the spatial region (not shown), and the load on a task server 210A-210C managing the spatial region (not shown).

As depicted, the system 200' further comprises the optional load balancer 250. As described above with regard to FIG. 2A, the load balancer 250 typically employs simple methods for selecting the particular task router 260A-260C to which it forwards the incoming tasks 230A-230F. For example, the load balancer performs a round-robin scheduling. For example, the load balancer 250 sends task requests to the task routers 260A-260C so as to minimize differences between estimated loads of the task servers. Alternatively, the load balancer determines an optimum task router 260A-260C to receive an incoming task 230A-230F based on a consultation by the load balancer of the spatial region database 215 so as to determine a current state of spatial regions. In embodiments in which the load balancer 250 is not present, a requester or other entity sending the task 230A-230F can send to a specific task router 260A-260C.

The task routers 260A-260C are configured to route the tasks 230A-230C to a proper task server 210A-2100. The task routers 260A-260C are configured to estimate a task server 210A-210C best situated to perform the task 230A-230C. For example, the task routers 260A-260C estimate the task server 210A-210C best situated to perform the task 230A-230C based on a comparison of spatial regions (not pictured) managed by the respective task servers 210A-210C.

The task routers 260A-260C consult the spatial region database 215 and, using the spatial region database 215, route the tasks 230A-230F to task servers 210A-210C managing the corresponding spatial regions (not shown). Moreover, the first task server 210A manages robots 220A-220F that are currently located within the spatial region (not shown) corresponding to the first task server 210A. As depicted, the first task server 210A currently manages a first robot 220A and a second robot 220B. Similarly, the second task server 210B manages robots 220A-220F that are currently located within the spatial region (not shown) corresponding to the second task server 210B. As depicted, the second task server 210B currently manages a third robot 220C and a fourth robot 220D. Similarly, the third task server 210C manages robots 220A-220F that are currently located within the spatial region (not shown) corresponding to the third task server 210C. As depicted, the third task server 210C currently manages a fifth robot 220E and a sixth robot 220F.

For example, the load balancer 250 forwards the first task 230A to the first task router 260A. To determine spatial region requirements of the task 230A, the first task router 260A checks one or more of the first task 230A and the spatial region database 215. If the spatial region requirements of the task 230A lie within the spatial region corresponding to the first task server 210A, the first task router 260A determines that it is likely that the first task server 210A can handle the task 230A. If the spatial region requirements of the task 230A do not lie within the spatial region corresponding to the first task server 210A, the first task router 260A determines that it is likely that the first task server 210A cannot handle the task 230A.

If the first task router 260A determines that the task 230A can be carried out within the spatial region managed by the first task server 210A, the first task router 260A places the task 230A in the first task queue 240A of the first task server 210A. Upon receiving a robot availability notification, the first task server 210A forwards the task 230A to one or more of the first robot 220A and the second robot 220B.

If the first task router 260A determines that the task 230A cannot be carried out within the spatial region managed by the first task server 210A, the first task router 260A finds another task server 210B-210C to which the task 230A can be forwarded. Optionally, the first task router 260A queries the spatial region database 215 to find the task server 210B-210C to which to forward the task 230A.

At such time that a robot 220A-220B is available, the first task server 210A assigns the task 230A from the first task queue 240A to the available robot 220A-220B.

Figure 3:
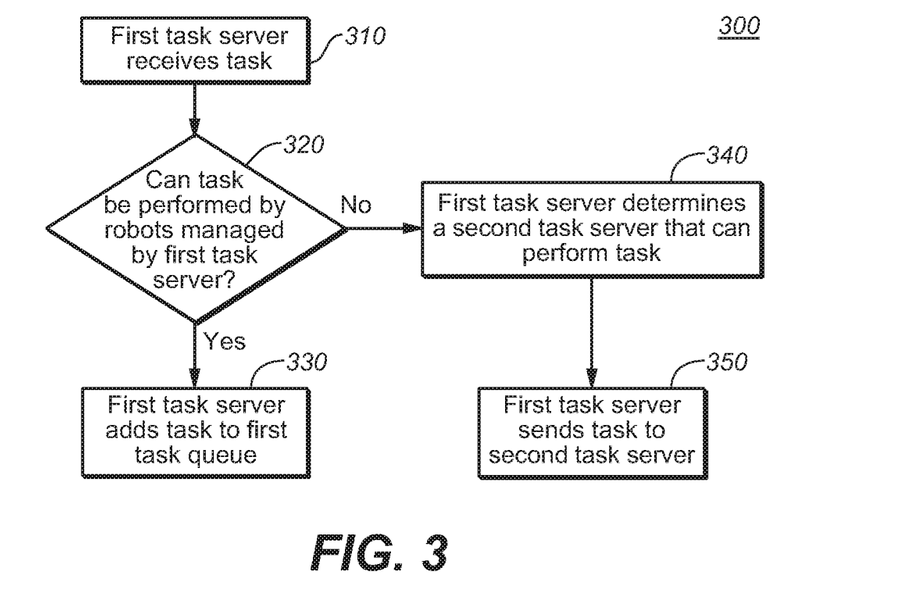
FIG. 3 is a flowchart of a method for load balancing of robots.

FIG. 3 is a flowchart of a method 300 for load balancing of robots. The order of steps in the method 300 is not constrained to that shown in FIG. 3 or described in the following discussion. Several of the steps could occur in different order without affecting the final result.

In step 310, a first task server comprising a first task queue receives a task to be performed by a robot. Block 310 then transfers control to block 320.

In step 320, the first task server determines if the task can be performed by the robots managed by the first task server. If the task can be performed by the first task server, block 320 then transfers control to block 330. If the task cannot be performed by the first task server, block 320 transfers control to block 340.

In step 330, the first task server adds the task to the first task queue. Block 330 then terminates this process.

In step 340, the first task server finds a second task server that can perform the task. For example, the first task server may consult the spatial region database to find a second task server that manages a spatial region in which the task can be performed. For example, the first task server may consult a set of other task servers to find a second task server that has a lower load. Block 340 then transfers control to block 350.

In step 350, the first task server sends the task to the second task server that the first task server has selected to perform the task. Block 350 then terminates this process.

Figure 4:
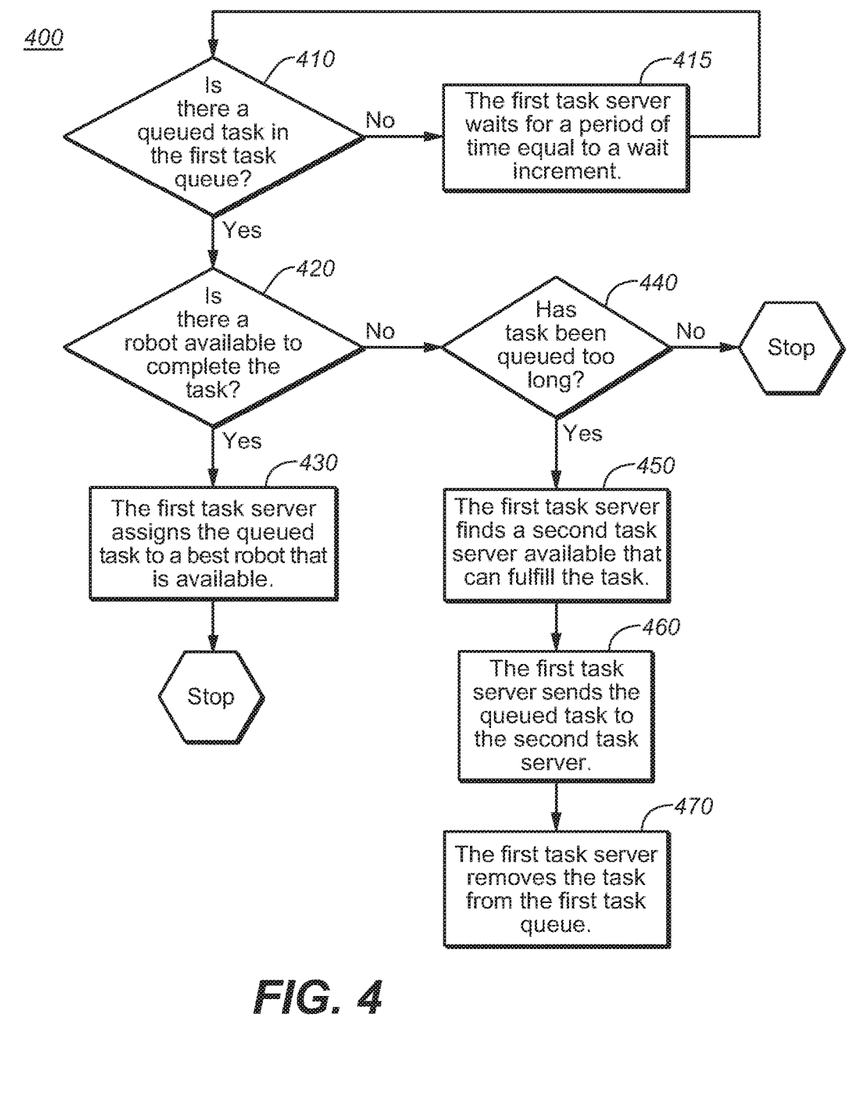
FIG. 4 is a flowchart of a method for load balancing of robots.

FIG. 4 is a flowchart of a method 400 for load balancing of robots. The order of steps in the method 400 is not constrained to that shown in FIG. 4 or described in the following discussion. Several of the steps could occur in different order without affecting the final result. The method 400 can potentially be simultaneously run over two or more of the queued tasks in a task server's task queue.

In step 410, a first task server comprising a first task queue checks if there are any tasks remaining in the first task queue. If there are no unassigned tasks, then block 410 transfers control to block 415. If there is a task that has not yet been assigned, then block 410 transfers control to block 420.

In step 415, the first task server waits for a period of time equal to a wait increment. For example, the wait increment comprises one or more of a fixed period of time, a variable period of time, and a user-specified period of time. Alternatively, or additionally, the waiting period can end upon receipt of an instruction to proceed. Upon resumption, the process loops back to step 410. For example, an instruction to proceed is generated when a new task is added to the first task queue. For example, an instruction to proceed is generated when a robot completes a task. For example, an instruction to proceed is generated when a robot comes online. For example, an instruction to proceed is generated when a robot becomes available for task assignment.

In step 420, the first task server checks if there is a robot available to perform the task. If there is a robot available to perform the task, then block 420 transfers control to block 430. If there are no robots available, then block 420 transfers control to block 440.

In step 430, the first task server assigns the queued task to a best robot that is available. For example, the best robot is selected based on one or more of proximity to the first task server and a requirement of the task. For example, the best robot is selected based on its having a most appropriate charge level of available robots. Block 430 then transfers control back to block 410 to check for additional queued tasks to assign.

In step 440, the first task server determines if a task queue time for which the task has been queued exceeds a trigger time. If the task has been queued for a time exceeding the trigger time, then block 440 will transfer control block 450. For example, the trigger time that triggers a transfer to block 450 is predetermined by a user. If the task queue time does not exceed the trigger time, then block 440 will terminate the process.

In step 450, the first task server finds a second task server available that can fulfill the task. Block 450 transfers control to block 460.

In step 460, the first task server sends the queued task to the second task server. Block 460 then transfers control to block 470.

In block 470, the first task server removes the task from the first task queue. For example, the first task server removes the task from the first task queue after the second task server acknowledges receipt of the task. Block 470 then terminates the process.

Optionally, an additional step (not pictured) may be performed after the step of sending in block 460 and before the step of removing in block 470, of receiving, by the first task server, from the second task server, an acknowledgement of the second task server's receipt of the task.

Figure 5A:
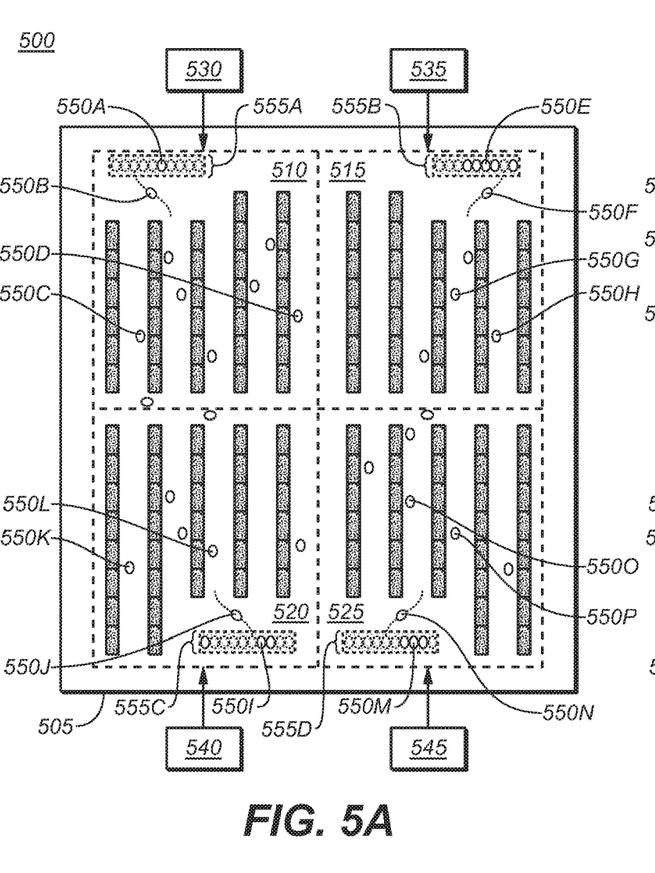
FIGS. 5A-5C are a set of three diagrams that schematically depict use of a spatially-oriented tree structure to perform load balancing of robots.
Figure 5B:
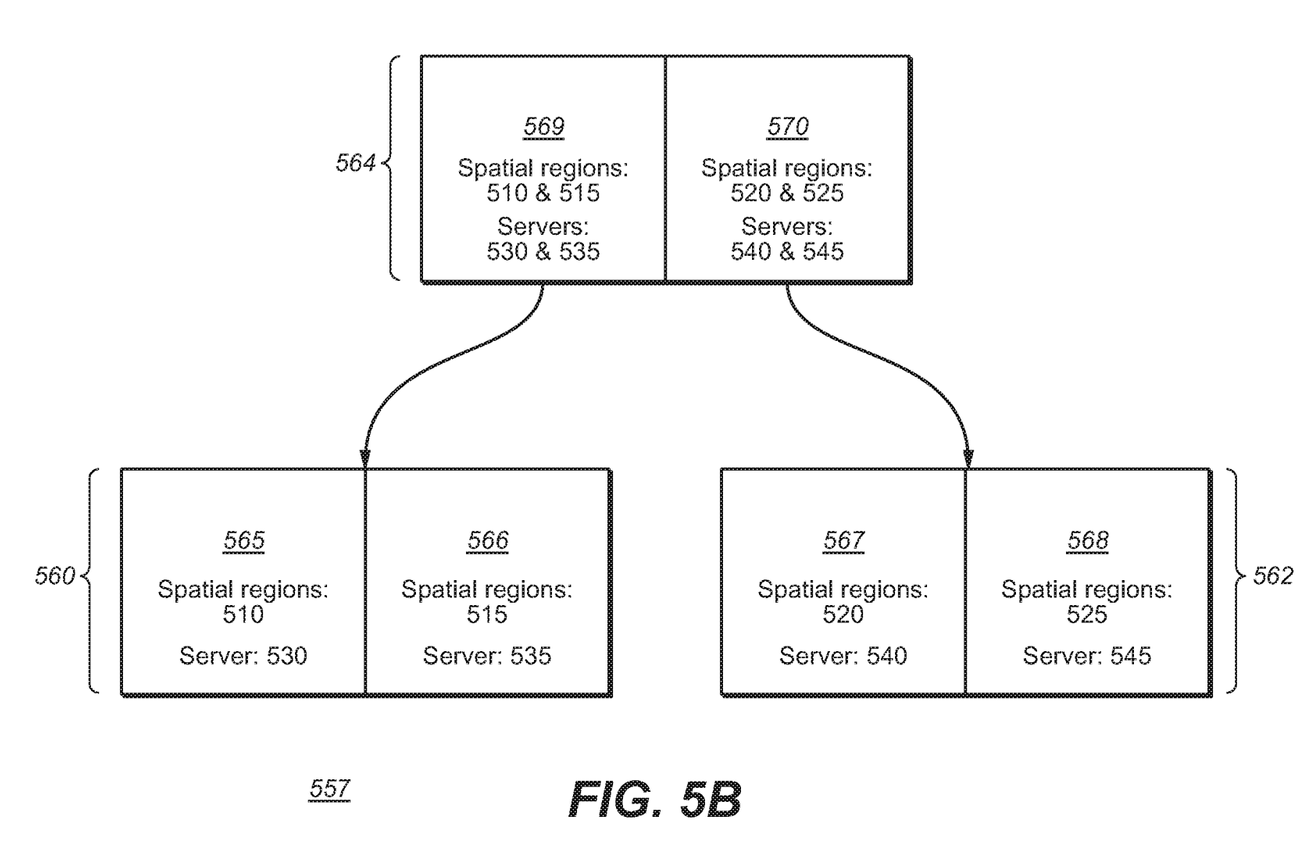
Figure 5C:
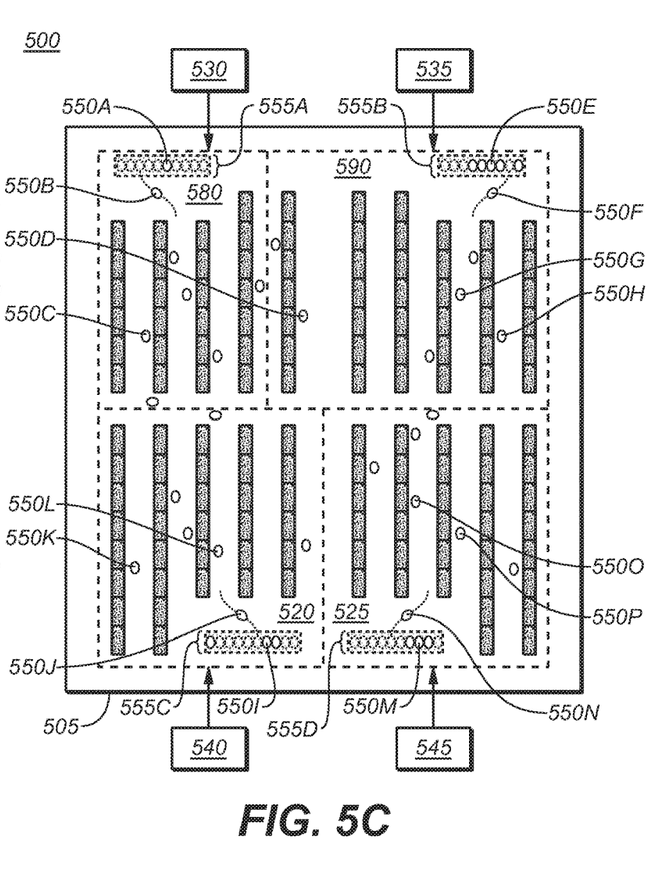

FIGS. 5A-5C are a set of three diagrams that schematically depict use of a spatially-oriented tree structure to perform load balancing of robots.

As shown in FIGS. 5A-5C, the spatial regions allocated to each task server may be represented by spatial data structures. For example, one or more of the spatial regions may be represented by one or more of an R-Tree, an R*-Tree, a Scalable Distributed R-Tree (SD-RTree) database, a Quadtree, a bounding volume hierarchy, a spatial hash table, and another spatial data structure.

For example, one or more of the spatial regions may be represented or stored in a distributed database shared across one or more of the task servers. For example, the one or more spatial regions may be stored in a Scalable Distributed R-Tree (SD-RTree) database shared across one or more of the task servers.

FIGS. 5A and 5C depict a representative load balancing operation in which spatial regions controlled by different task servers are changed to balance loads on robots. FIG. 5A depicts a representative robot distribution prior to load balancing. FIG. 5B depicts an exemplary spatially-oriented tree structure as used by the system and method for load balancing of robots. FIG. 5C depicts a representative robot distribution after load balancing.

As depicted in FIG. 5A, a system 500 for load balancing of robots comprises a site 505. The site 505 comprises a first spatial region 510, a second spatial region 515, a third spatial region 520, and a fourth spatial region 525. The system 500 further comprises a first task server 530 that manages the first spatial region 510, a second task server 535 that manages the second spatial region 515, a third task server 540 that manages the third spatial region 520, and a fourth task server 545 that manages the fourth spatial region 525.

The system 500 further comprises robots 550A-550P. The robots 550A-550D are currently located in the first spatial region 510 controlled by the first task server 530.

The robots 550E-550H are currently located in the second spatial region 515 controlled by the second task server 535.

The robots 550I-550L are currently located in the third spatial region 520 controlled by the third task server 540.

The robots 550M-550P are currently located in the fourth spatial region 525 controlled by the fourth task server 545.

The first spatial region 510 further comprises a first robot storage 555A configured to store robots 550A-550P that are not currently engaged in a task. The second spatial region 515 further comprises a second robot storage 555B configured to store robots 550A-550P that are not currently engaged in a task. The third spatial region 520 further comprises a third robot storage 555C configured to store robots 550A-550P that are not currently engaged in a task. The fourth spatial region 525 further comprises a fourth robot storage 555D configured to store robots 550A-550P that are not currently engaged in a task. Currently, the first robot storage 555A comprises the robot 550A. Currently, the second robot storage 555B comprises the robot 550E and four other robots 550A-550P. Currently, the third robot storage 555C comprises the robot 550I and one other robot 550A-550P. Currently, the fourth robot storage 555D comprises the robot 550M and two other robots 550A-550P. The robot storage 555A-555D may comprise one or more robot charging stations configured to charge robots 550A-550P that are not currently engaged in a task.

Currently, the first spatial region 510 comprises eight active robots 550A-550P including the robots 550C and 550D. Currently, the first spatial region 510 further comprises the robot 550B that is being sent into action.

Currently, the second spatial region 515 comprises four active robots 550A-550P including the robots 550G and 550H. Currently, the second spatial region 515 further comprises the robot 550F that is being sent into action.

Currently, the third spatial region 520 and the fourth spatial region 525 each comprise six active robots 550A-550P and a seventh robot 550A-550P that is being sent into action. The third spatial region 520 currently comprises the active robots 550K and 550L and four other active robots 550A-550P. The third spatial region 520 further currently comprises the robot 550J that is being sent into action. The fourth spatial region 525 currently comprises the active robots 5500 and 550P and four other active robots 550A-550P. The fourth spatial region 525 further currently comprises the robot 550N that is being sent into action.

One definition of load on a region 510, 515, 520, 525 is a number of active robots 550A-550P in the region 510, 515, 520, 525. According to this definition of load, the first spatial region 510 currently has a higher load than the second spatial region 515. While a number of active robots 550A-550P is only one possible definition of load, using that definition of load, currently the first spatial region 510 has a load of nine active robots 550A-550P, the second spatial region 515 has a load of five active robots 550A-550P, the third spatial region 520 has a load of seven active robots 550A-550P, and the fourth spatial region 525 has a load of seven active robots 550A-550P.

FIG. 5B symbolically shows a representation in computer memory of an R-Tree 557 used by the system 500 for load balancing of robots 550A-550P. The R-Tree 557 comprises nodes 560, 562, 564 arranged in a tree-like structure. A node 560, 562, 564 comprises one or more index records. The nodes 560 and 562 are leaf nodes. The node 564 is a root node.

The first leaf node 560 comprises index records 565 and 566. The second leaf node 562 comprises index records 567 and 568. The first index record 565 represents the first spatial region 510. The first index record 565 comprises information that the first task server 530 manages the first spatial region 510.

The root node 564 comprises index records 569 and 570. The index record 569 comprises a link to the child node 560.

At least one spatial region 510, 515, 520, 525 in an index record 565-568 of the R-Tree 557 is managed by a respective associated task server 530, 535, 540, 545. As depicted, each spatial region 510, 515, 520, 525 is managed by the associated task server 530, 535, 540, 545 as indicated using the server numbering system of FIG. 5A. For example, the spatial region 510 represented by the index record 565 is managed by the associated task server 530.

As is typical with an R-Tree, the spatial region of a non-leaf index record comprises all of the spatial regions associated with the index records in the sub-tree below. As shown, the index record 569 represents a spatial region combining regions 510 and 515, which is defined as the minimum bounding box of regions 510 and 515.

Tasks may be represented by a minimum bounding box. This minimum bounding box can also be used to determine which of the one or more task servers 530, 535, 540, 545 can fulfill the task. For example, the R-Tree 557 allows efficient search for which one or more spatial regions 510, 515, 520, 525 comprise the task minimum bounding box. Alternatively, other efficient search methods could be used, such as computing a spatial hash of the regions 510, 515, 520, 525 and storing similar index records in a hash table. Using the R-Tree 557, the spatial regions 510, 515, 520, and 525 are treated as respective leaves 565-568 comprised in the R-Tree 557.

To perform a query against the R-Tree 557 according to the system 500 for load balancing of robots 550A-550P, the query itself is treated as a minimum bounding box. The search starts at the root node 564 comprising the index records 565 and 566. The computer determines if the query overlaps any of the spatial regions 510, 515, 520, and 525. If the query overlaps the spatial region represented by index record 569, which comprises the minimum bounding box of the spatial regions 510 and 515, then the computer will further explore the leaf node 560. If the query does not overlaps the spatial regions 510 and 515, then the computer will not further explore the leaf node 560.

For example, if the index record 565 comprises the query, the computer searches the node 560, which comprises the index records 565 and 566. However, the computer would not search the node 562, which comprises the index records 567 and 568, because the spatial regions 520 and 525 that their associated parent index record 570 represents do not comprise any part of the spatial region of interest, namely, the query.

FIG. 5C shows the resulting configuration of the system 500 after rebalancing of the load is performed and spatial regions are reallocated, creating a new fifth spatial region 580 and creating a new sixth spatial region 590 and eliminating the first spatial region 510 and the second spatial region 515. Now the four existing spatial regions are the third spatial region 520, the fourth spatial region 525, the fifth spatial region 580, and the sixth spatial region 590. The rebalancing balances loads on the four spatial regions 520, 525, 570, and 580. After rebalancing, third spatial region 520, the fourth spatial region 525, the fifth spatial region 580, and the sixth spatial region 590 each has a load of six active robots 575A-575P. The robot 550D, which was previously in the first spatial region 510, is now located in the new sixth spatial region 590.

It should be noted that load rebalancing will not necessarily result in any two spatial regions having the same number of active robots 575A-575P. Load rebalancing can ameliorate inequities in load balance without necessarily completely creating exact mathematical equality in load balances between the different spatial regions 510, 515, 520, 525, 580, and 590.

Figure 6:
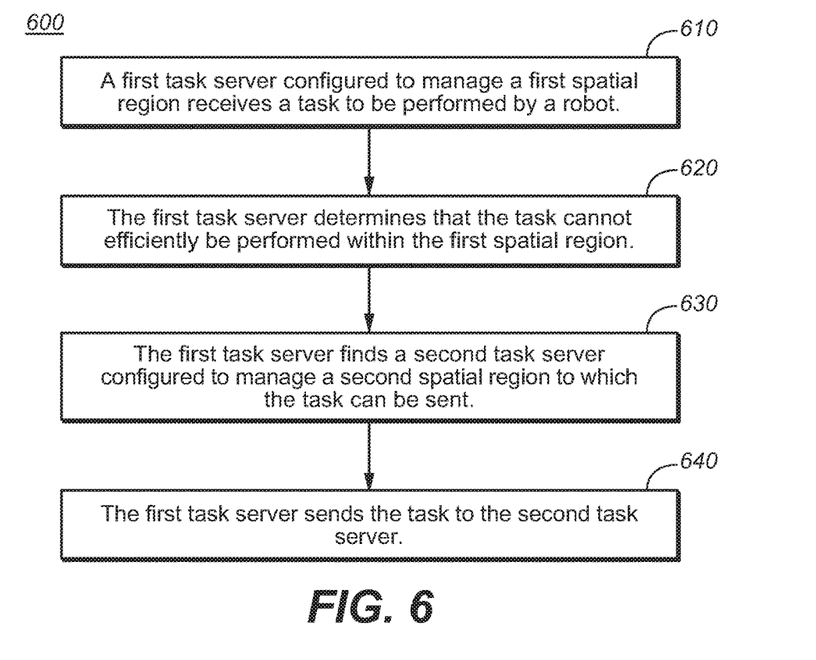
FIG. 6 is a flowchart of a method for load balancing of robots.

FIG. 6 is a flowchart of a method 600 for load balancing of robots. The order of steps in the method 600 is not constrained to that shown in FIG. 6 or described in the following discussion. Several of the steps could occur in different order without affecting the final result. The method 600 can potentially be simultaneously run over two or more of the queued tasks in a task server's task queue.

In step 610, a first task server configured to manage a first spatial region receives a task to be performed by a robot. Block 610 then transfers control to block 620.

In step 620, the first task server determines that the task cannot efficiently be performed within the first spatial region. Block 620 then transfers control to block 630.

In step 630, the first task server finds a second task server configured to manage a second spatial region to which the task can be sent. Block 630 then transfers control to block 640.

In step 640, the first task server sends the task to the second task server. Block 640 then terminates the process.

Figure 7:
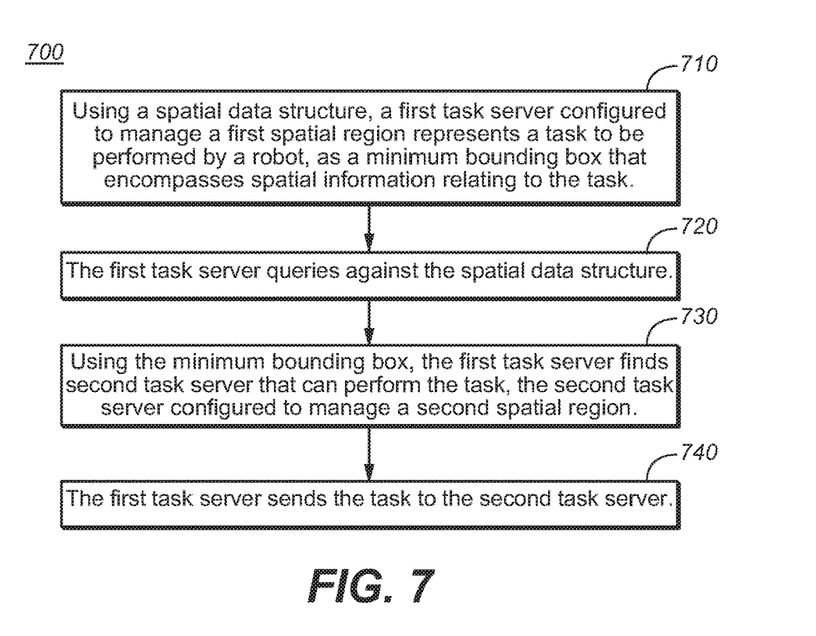
FIG. 7 is a flowchart of a method for load balancing of robots.

FIG. 7 is a flowchart of a method 700 for load balancing of robots. The order of steps in the method 700 is not constrained to that shown in FIG. 7 or described in the following discussion. Several of the steps could occur in different order without affecting the final result. The method 700 can potentially be simultaneously run over two or more of the queued tasks in a task server's task queue.

In step 710, using a spatial data structure, a first task server configured to manage a first spatial region represents a task to be performed by a robot, as a minimum bounding box that encompasses spatial information relating to the task. Block 710 then transfers control to block 720.

In step 720, the first task server queries against the spatial data structure. Block 720 then transfers control to block 730.

In step 730, using the minimum bounding box, the first task server finds second task server that can perform the task, the second task server configured to manage a second spatial region. Block 730 then transfers control to block 740.

In step 740, the first task server sends the task to the second task server. Block 740 then terminates the process.

According to a further set of embodiments of the invention, the task may comprise a robot charging its own batteries. For example, one or more robots may report its respective charge level to the task server.

According to still other embodiments of the invention, a task server may have a robot charged while that robot is simultaneously performing another task. For example, a task server may have a robot charged while that robot is simultaneously performing a task that can be performed while the robot is in a stationary position. For example, the robot may have an arm that is capable of assembling boxes while the charging process is occurring. For example, the task server determines that boxes need to be assembled and that one or more of the robots need to be charged.

According to still further embodiments of the invention, the task server can instruct the robot to approach a workcell that comprises a charging device. For example, the charging device may be configured to transmit power directly to a coil in the robot. For example, the charging device may comprise a charging coil. For example, the charging coil may comprise a resonant charging coil. For example, the charging coil may comprise a wireless resonant charging coil. For example, the charging coil may comprise an inductive charging coil. For example, the charging coil may be positioned below the workcell. For example, the charging coil may be embedded in a workcell table. According to a further set of embodiments of the invention, a task server may swap a robot out of a charging device in order to charge another robot that is more in need of charging.

According to yet other embodiments of the invention, one or more boxes may be assembled in the workcell. For example, the workcell may comprise a charge dock configured to connect the robot up for charging. For example, the charging device may comprise the charge dock. For example, a floor of the workcell may comprise the charge dock. For example, a table of the workcell may comprise the charge dock. For example, an assembly table of the workcell may comprise the charge dock.

Advantages of the invention include providing enhanced robot recharging time by balancing loads on different servers. Advantages of embodiments of the invention comprising multiple task servers that assign spatial regions to the different task servers are that there is greater robustness in that a single master server is not responsible for the entire system. Throughput advantages are also available from these embodiments.

For example, it will be understood by those skilled in the art that software used by the system and method for load balancing of robots may be located in any location in which it may be accessed by the system. It will be further understood by those of skill in the art that the number of variations of the network, the location of the software, and the like are virtually limitless. It is intended, therefore, that the subject matter in the above description shall be interpreted as illustrative and shall not be interpreted in a limiting sense. For example, system components, including the load balancer, the task routers, the master server, the task servers, and the task queues, can be combined and recombined in virtually unlimited ways. Also, the system components can be spread across one or more physical servers, can occur in a variety of numbers, and can be in a variety of physical locations.

For example, it will be understood by those skilled in the art that software used by the system and method for load balancing of robots may be located in any location in which it may be accessed by the system. It will be further understood by those of skill in the art that the number of variations of the network, the location of the software, and the like are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

We claim:

1. A system for load balancing of robots, comprising:
at least two robots;
a first computer comprising a first task server; and
a second computer comprising a second task server, the second task server operably connected to the first task server, the first task server configured to manage a first spatial region, the first task server operably connected to the at least two robots, the first task server configured to receive a task to be performed by a robot at a site comprising the first spatial region, the first task server further configured to assign the task to one of the two or more robots if the task can efficiently be performed within the first spatial region, thereby creating enhanced task loads across the first task server and the second task server, wherein the first task server and the second task server are configured to interactively assign spatial regions so as to approximately balance loads on the first task server and the second task server, wherein the load is defined as a length of a server's task queue.

2. The system of claim 1, further comprising a load balancer operably connected to the first task server, the load balancer operably connected to the second task server, the load balancer configured to receive the task, the load balancer further configured to select the first task server or the second task server to handle the task.

3. The system of claim 2, wherein the load balancer selects the first task server or the second task server to which it forwards the task by one or more of round-robin scheduling, minimizing differences between estimated loads of the task servers, and reviewing the spatial region database.

4. The system of claim 3, further comprising a master server operably connected to the first task server, the master server operably connected to the second task server, the master server configured to assign spatial regions to one or more of the first task server and the second task server.

5. The system of claim 4, wherein the master server is further configured to monitor a load of one or more of the first task server and the second task server.

6. The system of claim 4, wherein the master server is further configured to manage assignment of robots to one or more of the first task server and the second task server.

7. The system of claim 2, wherein the load balancer is further configured to forward the task on to the selected task server.

8. The system of claim 1, wherein the first task server comprises a first task queue at which tasks are queued.

9. The system of claim 8, wherein the second task server comprises a second task queue at which tasks are queued.

10. The system of claim 9, wherein the first task server further comprises a first task router configured to route the task to one or more of a task server, a robot able to perform the task, the first task queue, and the second task queue.

11. The system of claim 1, further comprising a spatial region database configured to map task servers to spatial regions that the task servers manage, the spatial region database operably connected to the servers.

12. The system of claim 11, wherein the spatial region database comprises data regarding one or more spatial regions including one or more of a spatial region managed by a task server, a current location of a robot, a status of a task being performed in the spatial region, and a load on a task server managing the spatial region.

13. The system of claim 1, wherein the first task server is further configured to send the task to the second task server if the task cannot efficiently be performed within the first spatial region.

14. The system of claim 1, wherein the first task server manages one or more robots located within the first spatial region.

15. The system of claim 1, wherein the first task server manages all robots located within the first spatial region.

16. The system of claim 1, wherein the first task server manages one or more robots assigned tasks that are to be performed within the first spatial region.

17. The system of claim 1, wherein the first task server manages all robots assigned tasks that are to be performed within the first spatial region.

18. The system of claim 1, wherein the first task server is further configured to divide the task into at least two sub-tasks.

19. A method for load balancing of robots, comprising:
receiving, by a first task server configured to manage a first spatial region, a task to be performed by a robot;
determining, by the first task server, that the task cannot efficiently be performed within the first spatial region;
finding, by the first task server, a second task server configured to manage a second spatial region to which the task can be assigned;
sending, by the first task server, the task to the second task server, thereby creating enhanced task loads across the first task server and the second task server; and
changing, by the first task server, one or more of the first spatial region and the second spatial region, wherein the step of changing comprises reducing a load on one or more of the first task server and the second task server, wherein the load is defined as a length of a server's task queue.

20. The method of claim 1, wherein the step of changing comprises changing one or more of the first spatial region and the second spatial region based on one or more of types of tasks being assigned to the system, a quantity of tasks being assigned to the system, and a goal to more appropriately apportion tasks between task servers.

21. The method of claim 20, wherein the goal comprises creating one or more of more equivalent task loads, more equivalent number of tasks, and more similar task queue lengths.

22. The method of claim 1, wherein the finding step comprises analyzing a load on one or more of the first task server and the second task server.

23. The method of claim 22, wherein the load is defined as one or more of a number of active robots, a number of active tasks, a length of a server's task queue, a central processing unit (CPU) load by the task server, memory load on the task server, and a percentage of robots in a task server's spatial region that are active.

24. The method of claim 1, wherein receiving comprises one or more of receiving the task from a site management system, receiving the task through a web interface, receiving the task from a mobile phone, receiving the task from the second task server, and receiving the task from a load balancer.

25. The method of claim 1, further comprising a step, performed after the step of receiving and before the step of sending, of:
managing, by the first task server, one or more robots located within the first spatial region.

26. The method of claim 1, further comprising a step, performed after the step of receiving and before the step of sending, of:
managing, by the first task server, one or more robots that are assigned tasks that are to be performed within the first region.

27. The method of claim 1, wherein the finding step comprises finding the second task server that has an available robot to perform the task.

28. The method of claim 1, wherein the finding step comprises querying a spatial region database.

29. A method for load balancing of robots, comprising:
representing a task to be performed by a robot, by a first task server configured to manage a first spatial region, using a spatial data structure, as a minimum bounding box that encompasses spatial information relating to the task;
querying against the spatial data structure, by the first task server;
finding, by the first task server, using the minimum bounding box, a second task server that can perform the task, the second task server configured to manage a second spatial region;
sending the task, by the first task server, to the second task server, thereby enhanced task loads across the first task server and the second task server; and
changing, by the first task server, one or more of the first spatial region and the second spatial region, wherein the step of changing comprises reducing a load on one or more of the first task server and the second task server, wherein the load is defined as a length of a server's task queue.

30. The method of claim 29, wherein the spatial data structure comprises one or more of an R-Tree, an R*-Tree, a Scalable Distributed R-Tree (SD-RTree) database, a Quadtree, a bounding volume hierarchy, a spatial hash table, and another spatial data structure.

31. The method of claim 29, wherein the step of querying comprises treating the minimum bounding box as a query against the spatial data structure.

32. A method for load balancing of robots, comprising:
receiving, by a first task server comprising a first task queue, the first task server configured to manage a first spatial region, a task to be performed by a robot;
determining, by the first task server, that the task cannot be performed by the robots that the first task server manages;
finding, by the first task server, a second task server that can perform the task, the second task server configured to manage a second spatial region;
sending the task, by the first task server, to the second task server, thereby creating enhanced task loads across the first task server and the second task server; and
changing, by the first task server, one or more of the first spatial region and the second spatial region, wherein the step of changing comprises reducing a load on one or more of the first task server and the second task server, wherein the load is defined as a length of a server's task queue.

33. The method of claim 32, wherein the step of finding comprises querying a spatial region database.

34. A method for load balancing of robots, comprising:
checking, by a first task server comprising a first task queue, the first task server configured to manage a first spatial region, that there are tasks remaining in the first task server's task queue;
checking, by the first task server, that there is not a robot available to perform the task;
determining, by the first task server, that a task queue time for which the task has been queued exceeds a trigger time;
finding, by the first task server, a second task server that can fulfill the task, the second task server configured to manage a second spatial region;
sending, by the first task server, the queued task to the second task server;

removing, by the first task server, the task from the first task server's task queue, thereby creating enhanced task loads across the first task server and the second task server; and changing, by the first task server, one or more of the first spatial region and the second spatial region, wherein the step of changing comprises reducing a load on one or more of the first task server and the second task server, wherein the load is defined as a length of a server's task queue.

35. The method of claim 34, comprising an additional step, performed after the step of sending and before the step of removing, of:

receiving, by the first task server, from the second task server, an acknowledgement of the second task server's receipt of the task.

36. A method for load balancing of robots, comprising:

receiving, by a first task server comprising a task queue, the task server configured to manage a spatial region, a task to be performed by a robot;

determining, by the first task server, that the task can be performed by the robots that the first task server manages;

adding the task to the task queue, thereby creating enhanced task loads across the first task server and a second task server; and changing, by the first task server, one or more of the first spatial region and the second spatial region, wherein the step of changing comprises reducing a load on one or more of the first task server and the second task server, wherein the load is defined as a length of a server's task queue.

37. A method for load balancing of robots, comprising:

checking, by a first task server, the first task server configured to manage a spatial region, that there are tasks remaining in the first task server's task queue;

checking, by the first task server, that there is a robot available to perform the task;

assigning, by the first task server, a best robot that is available, wherein the best robot is selected based on one or more of proximity to the first task server, a requirement of the task, and a most appropriate charge level of available robots, thereby creating enhanced task loads across the first task server and a second task server; and changing, by the first task server, one or more of the first spatial region and the second spatial region, wherein the step of changing comprises reducing a load on one or more of the first task server and the second task server, wherein the load is defined as a length of a server's task queue.

\* \* \* \* \*

UNITED STATES PATENT AND TRADEMARK OFFICE
CERTIFICATE OF CORRECTION

PATENT NO. : 10,363,659 B2
APPLICATION NO. : 15/060528
DATED : July 30, 2019
INVENTOR(S) : Wise et al.

It is certified that error appears in the above-identified patent and that said Letters Patent is hereby corrected as shown below:

On the Title Page

Item (60), add "Related U.S. Application Data" with the following text: "Provisional application No. 62/127,408, filed on March 3, 2015."

Signed and Sealed this
Twenty-third Day of August, 2022

Katherine Kelly Vidal
*Director of the United States Patent and Trademark Office*